United States Patent
Tung

(10) Patent No.: US 9,207,697 B2
(45) Date of Patent: Dec. 8, 2015

(54) CONTROL CHIP AND CONNECTION MODULE UTILIZING THE SAME

(71) Applicant: Nuvoton Technology Corporation, Hsinchu Science Park (TW)

(72) Inventor: Shih-Hsun Tung, Hsinchu (TW)

(73) Assignee: Novoton Technology Corporation, Hsinchu Science Park (TW)

( * ) Notice: Subject to any disclaimer, the term of this patent is extended or adjusted under 35 U.S.C. 154(b) by 0 days.

(21) Appl. No.: 14/479,896

(22) Filed: Sep. 8, 2014

(65) Prior Publication Data
US 2015/0316943 A1 Nov. 5, 2015

(30) Foreign Application Priority Data
May 5, 2014 (TW) .............................. 103115925 A

(51) Int. Cl.
*G05F 1/10* (2006.01)
*G05F 1/613* (2006.01)

(52) U.S. Cl.
CPC ....................................... *G05F 1/613* (2013.01)

(58) Field of Classification Search
CPC ... G05F 1/613; G06F 13/00; H02J 2007/0062
See application file for complete search history.

(56) References Cited

U.S. PATENT DOCUMENTS

| | | | | |
|---|---|---|---|---|
| 7,310,697 B2* | 12/2007 | Pandit | ..................... | G06F 1/266 455/572 |
| 7,711,870 B2* | 5/2010 | Yoshida | .............. | G06F 13/4295 326/62 |
| 8,539,266 B2* | 9/2013 | Kawano | ................... | G06F 1/266 710/104 |
| 2010/0244587 A1* | 9/2010 | Tiovola | ............... | G06F 13/4081 307/130 |
| 2014/0225557 A1* | 8/2014 | Park | ...................... | H02J 7/0004 320/107 |
| 2014/0310545 A1* | 10/2014 | Xu | ........................... | G06F 1/28 713/320 |
| 2015/0058642 A1* | 2/2015 | Okamoto | ................ | G06F 13/14 713/300 |

FOREIGN PATENT DOCUMENTS

| | | |
|---|---|---|
| CN | 100476777 C | 4/2009 |
| CN | 102483728 A | 5/2012 |
| TW | 201007436 A | 2/2010 |
| TW | 201134573 A | 10/2011 |

OTHER PUBLICATIONS

TW Office Action dated Aug. 25, 2015 from corresponding TW Appl No. 10421133960, 5 pp.

* cited by examiner

*Primary Examiner* — Jeffrey Zweizig
(74) *Attorney, Agent, or Firm* — Muncy, Geissler, Olds & Lowe, P.C.

(57) ABSTRACT

A control chip including a first pin, a second pin, a trigger circuit and a control circuit is provided. The first pin is configured to couple to a connection port. The second pin is configured to couple to the connection port. The trigger circuit sets a level of the second pin to a second level when the connection port is coupled to an external electronic device and the level of the second pin is equal to a first level. The control circuit maintains the level of the second pin at the second level when a voltage of the first pin is equal to a pre-determined voltage.

20 Claims, 6 Drawing Sheets

CONTROL CHIP AND CONNECTION MODULE UTILIZING THE SAME

CROSS REFERENCE TO RELATED APPLICATIONS

This Application claims priority of Taiwan Patent Application No. 103115925, filed on May 5, 2014, the entirety of which is incorporated by reference herein.

BACKGROUND OF THE INVENTION

1. Field of the Invention

The invention relates to a control chip, and more particularly to a control chip which is capable of switching the operation mode of an electronic device and disposed in a connection module.

2. Description of the Related Art

In current USB transmittance technology, if a user desires to transmit data between a host device and an electronic device, the user must utilize a cable to connect the host device and the electronic device. With technological development, electronic devices serve different roles. Taking On The Go (OTG) technology as an example, when an electronic device has a OTG function, the electronic device can operate in a host mode or a device mode. In the host mode, the electronic device serves as a host and is capable of providing power to another electronic device (e.g. a peripheral device) via a cable. In the device mode, the electronic device serves as a peripheral device and is controlled by another electronic device, such as a computer.

Conventional technology utilizes different cables to set the operation modes of the OTG device. For example, if a user desires to activate the OTG device to enter a host mode, the user needs to utilize a first cable to connect the OTG device and a peripheral device. An identification pin of the first cable is set to a low level. If the user desires to activate the OTG device to enter a device mode, the user needs to utilize a second cable. An identification pin of the second cable is set to a high level. Therefore, the user needs two cables to activate the OTG device to enter different modes. Using two cables can be inconvenient.

BRIEF SUMMARY OF THE INVENTION

In accordance with an embodiment, a control chip includes a first pin, a second pin, a trigger circuit and a control circuit. The first pin is configured to couple to a connection port. The second pin is configured to couple to the connection port. The trigger circuit sets a level of the second pin to a second level when the connection port is coupled to an external electronic device and the level of the second pin is equal to a first level. The control circuit maintains the level of the second pin at the second level when a voltage of the first pin is equal to a pre-determined voltage.

In accordance with another embodiment, a connection module includes a first connection port and a control chip. The first connection port is configured to couple to a first external electronic device. The control chip includes a first pin, a second pin, a trigger circuit and a control circuit. The first pin is configured to couple to the first connection port. The second pin is configured to couple to the first connection port. The trigger circuit sets a level of the second pin to a second level when the first connection port is coupled to the first external electronic device and the level of the second pin is equal to a first level. The control circuit maintains the level of the second pin at the second level when a voltage of the first pin is equal to a pre-determined value.

In accordance with a further embodiment, a control chip includes a first pin, a second pin, a trigger circuit and a control circuit. The first pin is configured to couple to a connection port. The second pin is configured to couple to the connection port. The trigger circuit provides a specific level to the second pin when the connection port is coupled to an external electronic device. The control circuit maintains a level of the second pin at the specific level when a voltage of the first pin is equal to a pre-determined voltage.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
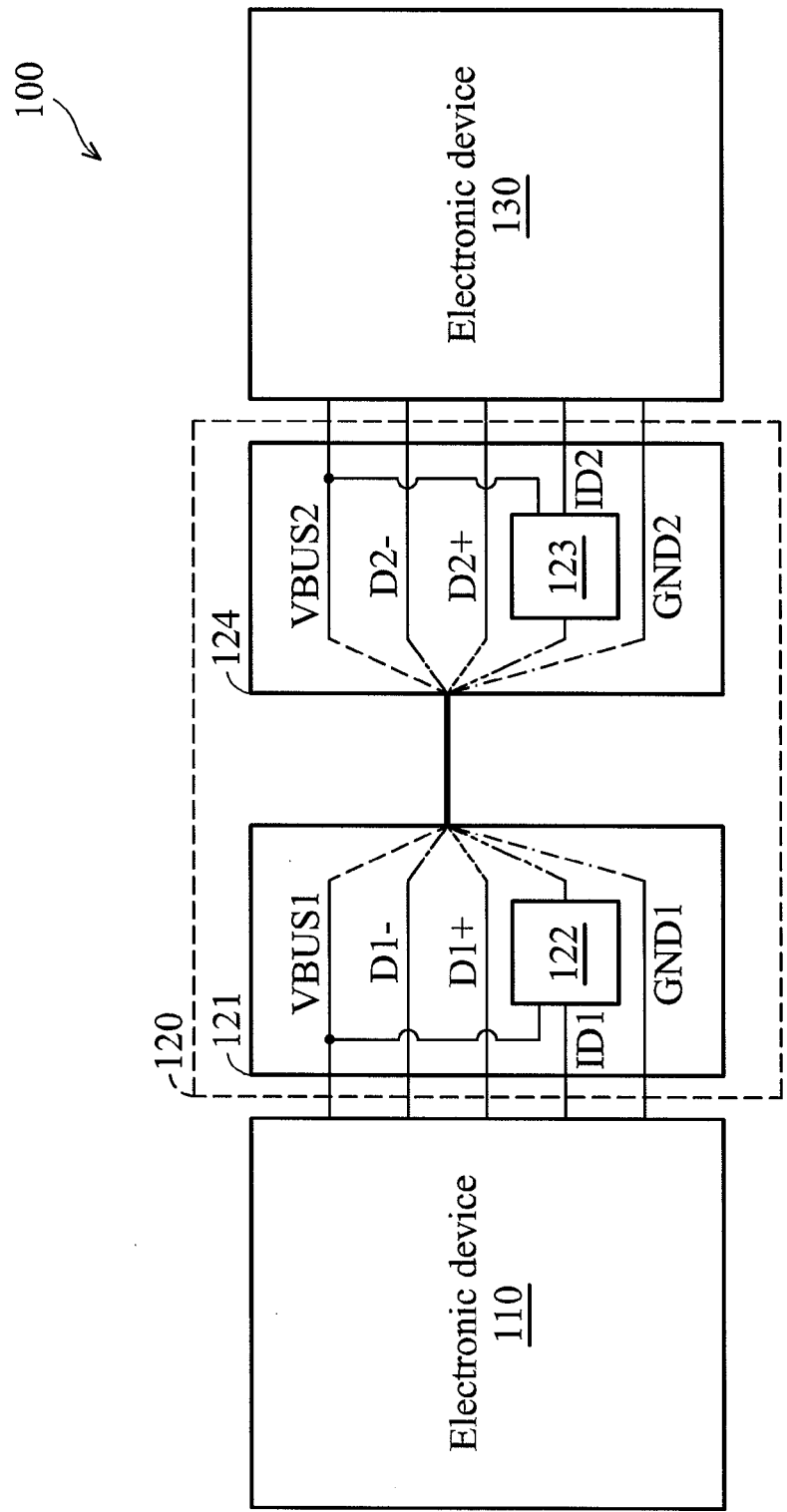
FIG. 1 is a schematic diagram of an exemplary embodiment of a transmittance system, in accordance with some embodiments.

FIG. 1 is a schematic diagram of an exemplary embodiment of a transmittance system, in accordance with some embodiments. The transmittance system 100 includes electronic devices 110, 130 and a connection module 120. The connection module 120 is coupled between the electronic devices 110 and 130 to transmit power and data between the electronic devices 110 and 130. The invention does not limit the type of connection module 120. In one embodiment, the connection module 120 is a cable or a connection board.

In this embodiment, when the electronic device 130 is an electronic device with an OTG function, the connection module 120 sets the operation mode of the electronic device 130 according to the type of the electronic device 110. For example, if the electronic device 110 is a computer, the connection module 120 activates the operation mode of the electronic device 130 such that the electronic device 130 operates in a device mode and the electronic device 110 provides power to and controls the electronic device 130. If the electronic device 110 is a peripheral device, the connection module 120 activates the operation mode of the electronic device 130 such that the electronic device 130 operates in a host mode and the electronic device 130 provides power to and controls the electronic device 110. If the electronic device 110 is an OTG device, the connection module 120 sets the operation modes of the electronic devices 110 and 130 according to a pre-determined value. In one embodiment, the connection module 120 sets the operation mode of an electronic device, which is first coupled to the connection module 120, to a host mode and sets the operation mode of another electronic device, which is finally coupled to the connection module 120, to a device mode.

Since the connection module 120 is capable of setting the operation mode of an OTG device into a host mode or a device mode, a user does not need to ready two cables. Therefore, the convenience of the transmittance system is increased. In this embodiment, the connection module 120 includes connection ports 121 and 124 and control chips 122 and 123. The connection port 121 is configured to couple to the electronic device 110 and the connection port 124 is configured to couple to the electronic device 130. The invention does not limit the kinds of connection ports 121 and 124. In this embodiment, the connection ports 121 and 124 are USB ports.

For example, the connection port 121 is a USB type-A port to couple a computer. The connection port 124 is a USB micro-A, a USB micro-B, a USB mini-A or a USB mini-B port to couple a device with an OTG function, such as a mobile phone or a peripheral device, such as a mouse or a printer. In other embodiments, the connection ports 121 and 124 are USB micro ports or USB mini ports to couple two devices with the OTG function.

In this embodiment, the connection port 121 is a USB micro port and includes pins VBUS1, D1−, D1+, ID1 and GND1. The pins VBUS1 and GND1 are power pins to transmit a high voltage and a low voltage, respectively. The pins D1− and D1+ transmit data. The pin ID1 is an identification pin. When the electronic device 110 is an OTG device, the OTG device operates in a host mode or a device mode according to the level of the pin ID1.

The connection port 124 is also a USB micro port and includes pins VBUS2, D2−, D2+, ID2 and GND2. Since the principles of the pins VBUS2, D2−, D2+, ID2 and GND2 are the same as the principles of the pins VBUS1, D1−, D1+, ID1 and GND1, the descriptions of the pins VBUS2, D2−, D2+, ID2 and GND2 are omitted.

The control chips 122 and 123 are combined in the connection module 120 to control the levels of the pins ID1 and ID2 according to the levels of the pins VBUS1 and VBUS2 respectively. Taking the control chip 122 as an example, when the electronic device 110 is a computer and is coupled to the connection module 120, the electronic device 110 pulls up the level of the pin VBUS1 of the connection module 120 such that the level of the pin VBUS1 of the connection module 120 is at a high level. At this time, the control chip 122 does not control the level of the pin ID1. In one embodiment, the state of the pin ID1 is at a high impedance state. In another embodiment, the control chip 122 may set the level of the pin ID1 at a low level or a high level. In some embodiments, if the connection port 121 is a USB type-A port, the control chip 122 can be omitted.

However, when the control chip 122 determines that the level of the pin VBUS1 is at a low level, it means that the electronic device 110 is not a computer. In other words, the electronic device 110 may be a peripheral device or an OTG device. At this time, the control chip 122 detects the level of the pin ID1 and determines that the electronic device 110 is a peripheral device or an OTG device according to the detection result.

For example, if the electronic device 110 is a peripheral device, the level of the pin ID1 is at a high impedance state. In this case, since the level of the pin VBUS1 is at the low level and the level of the pin ID1 is at the high impedance state, the control chip 122 does not operate. Conversely, if the electronic device 110 is an OTG device, the level of the pin ID1 is at a high level. At this time, the control chip 122 is charged according to the level of the pin ID1. When the voltage of the control chip 122 arrives at a pre-determined value, the control chip 122 sets the level of the pin ID1 to a low level such that the electronic device 110 enters a host mode. In the host mode, the electronic device 110 provides power to the pin VBUS1. At this time, the control chip 122 maintains the level of the pin ID1 at the low level.

In this embodiment, the control chips 122 and 123 are disposed in the connection ports 121 and 124 respectively, but the disclosure is not limited thereto. In other embodiments, the control chips 122 and 123 are disposed at other positions of the connection module 120. Taking the control chip 122 as an example, the control chip 122 can be disposed in any position in the connection module 120, as long as the control chip 122 is capable of coupling to the pins VBUS1 and ID1. Additionally, the invention does not limit the types of control chips 122 and 123. In one embodiment, the control chips 122 and 123 are application-specific integrated circuits (ASICs). Since the principles of the control chips 122 and 123 are the same, the control chip 123 is taken as an example to describe the principle of the control chip 123.

Figure 2:
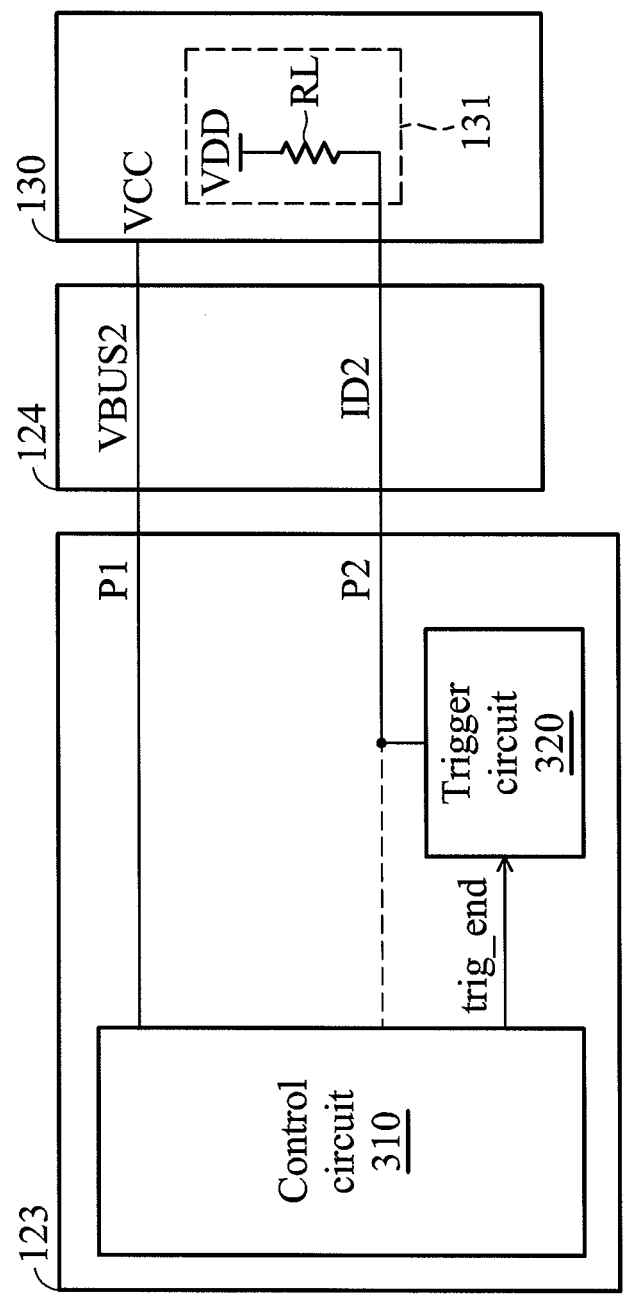
FIG. 2 is a schematic diagram of an exemplary embodiment of a control chip, in accordance with some embodiments.

FIG. 2 is a schematic diagram of an exemplary embodiment of a control chip, in accordance with some embodiments. The control chip 123 includes a control circuit 310, a trigger circuit 320 and pins P1 and P2. The pin P1 is coupled to the pin VBUS2 of the connection port 124. The pin P2 is coupled to the pin ID2 of the connection port 124. In one embodiment, the pin P1 is a power pad to receive operation power, and the pin P2 is an input/output pad.

The connection port 124 is configured to couple to the electronic device 130. In this embodiment, assume that the electronic device 130 is an OTG device. The OTG device includes a set unit 131. The set unit 131 includes a pull-up resistor RL to pull up the level of the pin ID2 to a first level, such as a high level. In this embodiment, the first level is approximately equal to the level of the voltage VDD. Therefore, when the connection port 124 is coupled to the electronic device 130, the level of the pin ID2 is equal to the first level.

In this embodiment, when the level of the pin ID2 is equal to the first level, the trigger circuit 320 changes the level of the pin ID2. In one embodiment, the level of the pin ID2 is changed to a second level, such as a low level. In this embodiment, the first level is higher than the second level. Furthermore, the invention does not limit how the trigger circuit 320 sets the level of the pin ID2 to a low level. Any method or circuit can be used, as long as the method or the circuit is capable of setting the level of the pin ID2 to a low level when the pin ID2 is coupled to an electronic device and the electronic device pulls up the level of the pin ID2 to a high level.

When the level of the pin ID2 is set to a low level, the electronic device 130 operates in a host mode. In the host mode, the electronic device 130 outputs a pre-determined voltage VCC to the pin VBUS2. Therefore, the voltage of the pin P1 is equal to the pre-determined voltage VCC. In this embodiment, the control circuit 310 receives an operation voltage via the pin P1. Therefore, when the voltage of the pin P1 is equal to the pre-determined voltage VCC, the control circuit 310 starts working to maintain the level of the pin ID2 at the second level. At this time, the electronic device 130 continuously operates in the host mode and continuously outputs the pre-determined voltage VCC.

In another embodiment, after the level of the pin ID2 is fixed at the second level, the control circuit 310 generates a control signal trig_end to disable the trigger circuit 320. Additionally, the invention does not limit the levels of the voltages VCC and VDD. In one embodiment, the voltage VDD is equal to or not equal to the voltage VCC.

In other embodiments, when the electronic device 130 is not an OTG device, such as a computer or a peripheral device, the electronic device 130 does not include the set unit 131. In this embodiment, the control chip 123 selectively sets or does not set the level of the pin ID2 according to the level of the pin P1.

For example, if the electronic device 130 is a computer, the computer directly outputs the pre-determined voltage VCC. Therefore, the control circuit 310 operates normally. In this case, the control circuit 310 does not set the level of the pin ID2. In other embodiments, the control circuit 310 sets the level of the pin ID2 at a low level, a high level or a high impedance state. If the electronic device 130 is a peripheral device, since the peripheral device cannot provide the pre-determined voltage VCC, the control circuit 310 does not operate. Therefore, the level of the pin ID2 may be maintained in a high impedance state.

Figure 3:
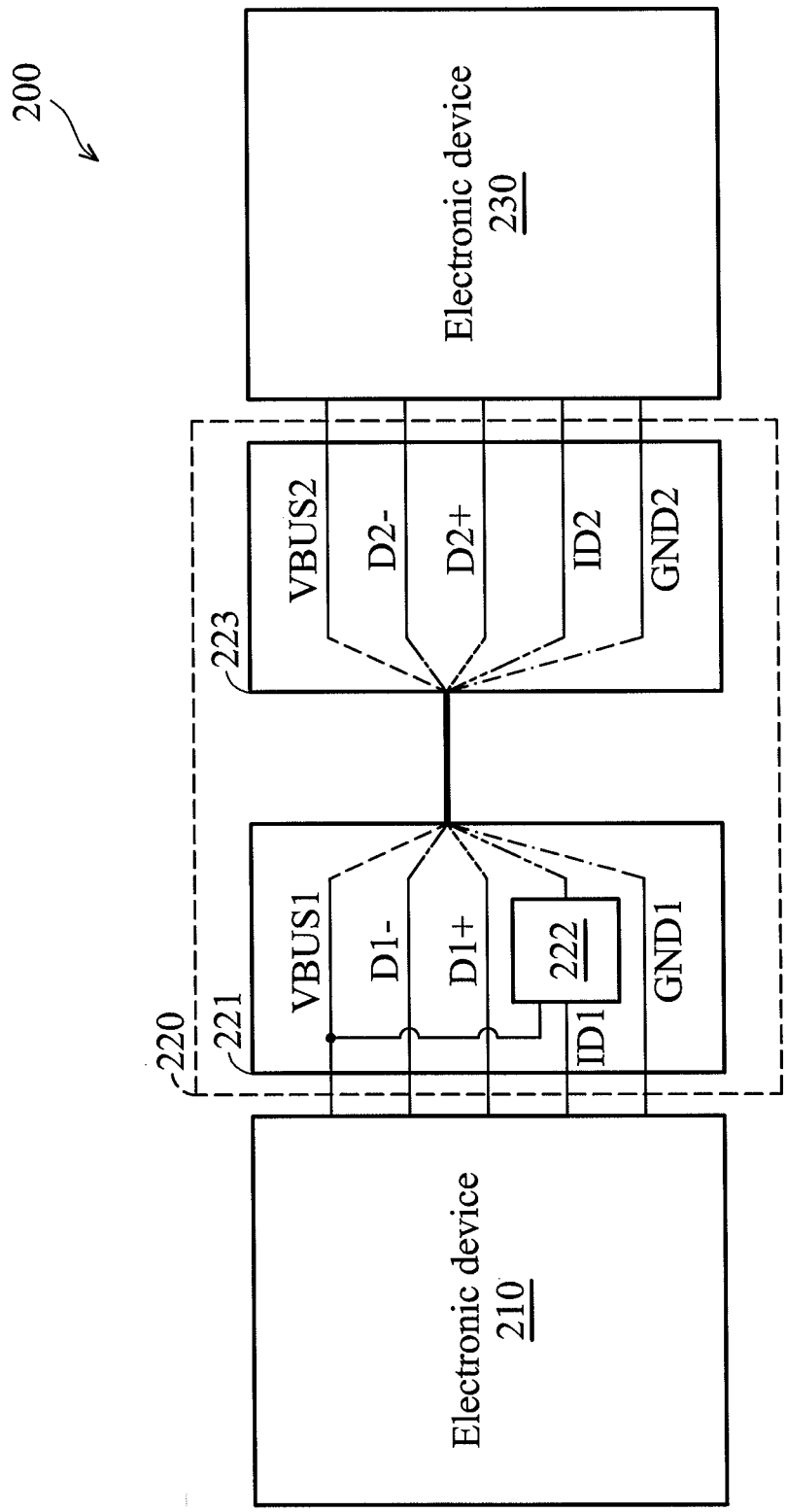
FIG. 3 is a schematic diagram of an exemplary embodiment of a connection module, in accordance with some embodiments.

Furthermore, the invention does not limit the number of control chips. In some embodiments, the connection module includes a single control chip to control the operation mode of an OTG device. Refer to FIG. 3, FIG. 3 is a schematic diagram of an exemplary embodiment of a connection module, in accordance with some embodiments. The connection module 220 includes connection ports 221 and 223 and a control chip 222. The connection ports 221 and 223 are configured to couple to the electronic devices 210 and 230 respectively. The control chip 222 controls the level of the pin ID1 in the connection port 221 according to the level of the pin VBUS1 to control the operation mode of the electronic device 210. The control chip 222 also controls the level of the pin ID2 in the connection port 223 according to the level of the pin VBUS2 to control the operation mode of the electronic device 230.

Since the principles of the connection ports 221 and 223 and control chip 222 are the same as the connection ports 121 and 124 and the control chip 122, the principles of the connection ports 221 and 223 and control chip 222 are omitted. Additionally, in this embodiment, the control chip 222 is disposed in the connection port 221, but the disclosure is not limited. The control chip 222 can be disposed in any position, as long as the control chip 222 is capable of coupling to the pins VBUS1, VBUS2, ID1 and ID2. In some embodiments, the control chip 222 is disposed in the connection port 223.

The transmittance system 200 includes electronic devices 210 and 230 and a connection module 220. The connection module 220 is coupled between the electronic devices 210 and 230 to transmit data and power. When the electronic device 210 is coupled to the connection module 220, if the level of the pin VBUS1 is at a high level, it means that the electronic device 210 is a computer. Therefore, the control chip 222 activates the pin ID1 to a high impedance state and sets the level of the pin ID2 to a high level. At this time, if the electronic device 230 is an OTG device and coupled to the connection module 220, the electronic device 230 operates in a device mode and the electronic device 210 provides power to the electronic device 230 and controls the electronic device 230.

When the level of the pin VBUS1 is a low level and the level of the pin ID1 is a high level, it means that the electronic device 210 is an OTG device. Therefore, the control chip 222 provides a low level to the pin ID1 and provides a high level to the pin ID2 such that the electronic device 210 operates a host mode and provides power to the electronic device 230. When the level of the pin VBUS1 is at a low level and the level of the pin ID1 is at the high impedance state, it means that the electronic device 210 is a peripheral device such that the electronic device 210 receives power provided by the electronic device 230.

Figure 4:
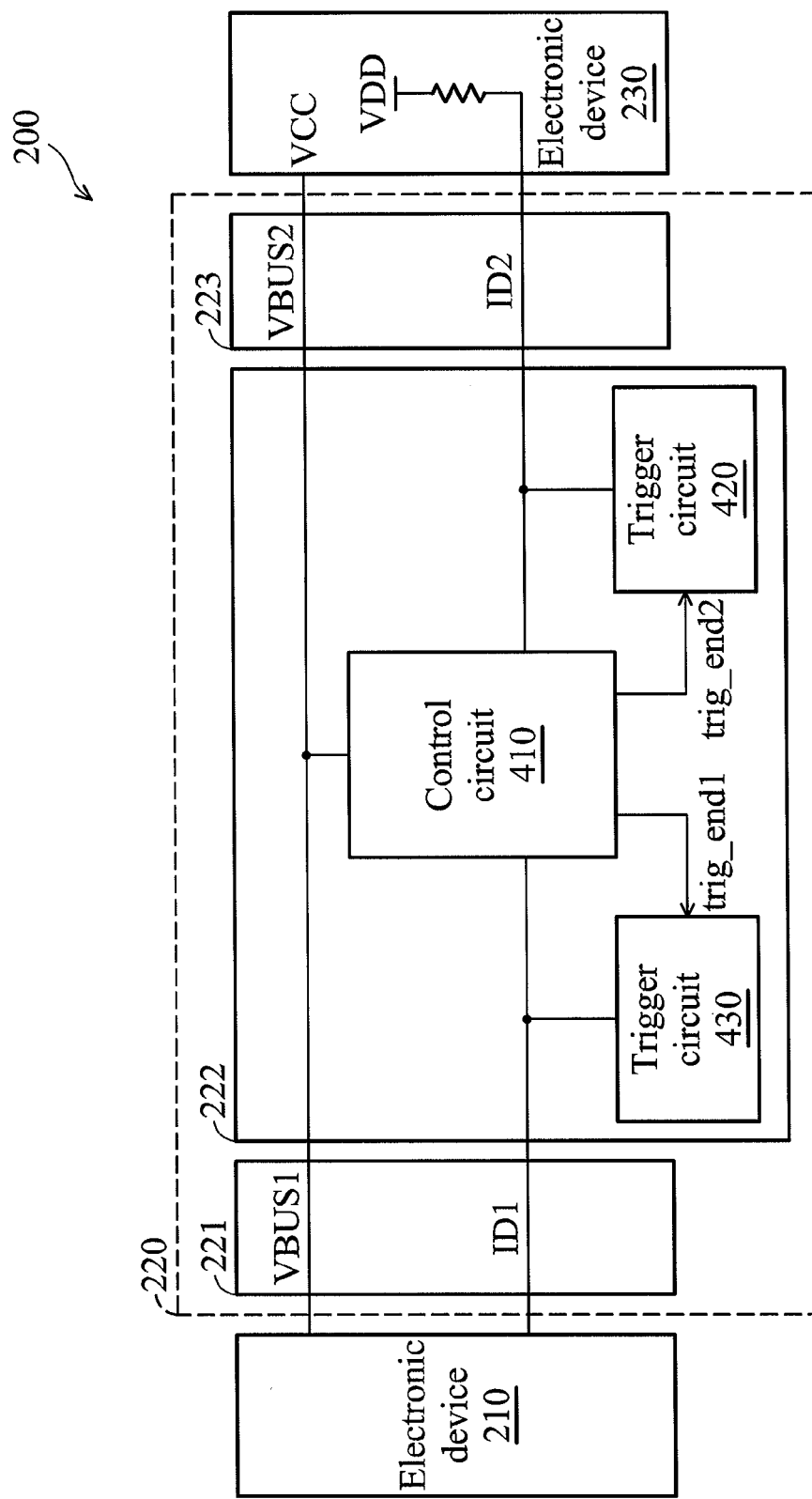
FIG. 4 is a schematic diagram of an exemplary embodiment of a control chip, in accordance with some embodiments.

FIG. 4 is a schematic diagram of an exemplary embodiment of a control chip, in accordance with some embodiments. The control chip 222 is coupled between the connection ports 221 and 223. The control chip 222 includes a control circuit 410 and trigger circuits 420 and 430. In this embodiment, the control circuit 410 controls the levels of the pins ID1 and ID2 according to the levels of the pins VBUS1 and VBUS2. In another embodiment, the control circuit 410 generates the control signals trig_end1 and trig_end2 to disable the trigger circuits 420 and 430.

The transmittance system 200 includes electronic devices 210, 230 and a connection module 220. The connection module 220 is coupled between the electronic devices 210 and 230 to transmit power and data. Assume that the electronic device 210 is a peripheral device, since the level of the pin VBUS1 is a low level and the pin ID1 is at a high impedance state, the control circuit 410 does not work temporarily. In this case, if the electronic device 230 is a computer, the level of the pin VBUS2 is pulled to a high level. Therefore, the control circuit 410 operates normally and the electronic device 210 receives power and data provided from the electronic device 230 via the connection module 220. In one embodiment, the control circuit 410 sets the level of the pin ID1 to a low level and set the level of the pin ID2 to a high level. In other words, the level of the pin ID1 is different from the level of the pin ID2.

If the electronic device 210 is a peripheral device and the electronic device 230 is an OTG device, when the electronic device 230 is coupled to the connection port 223, the level of the pin ID2 is a high level. The trigger circuit 420 is charged according to the level of the pin ID2. When the voltage stored in the trigger circuit 420 reaches a pre-determined value, the trigger circuit 420 sets the level of the pin ID2 to a low level. Therefore, the electronic device 230 outputs the pre-determined voltage VCC to activate of the control circuit 410.

The control circuit 410 maintains the level of the pin ID2 at the low level. At this time, the electronic device 230 operates in a host mode and the electronic device 230 provides power to the electronic device 210 and controls the electronic device 210. In another embodiment, after maintaining the level of the pin ID2 to the low level, the control circuit 410 disables the trigger circuit 420.

In other embodiments, if the electronic device 210 is a computer and the electronic device 230 is an OTG device, when the electronic device 210 is coupled to the connection port 221, the level of the pin VBUS1 is at a high level. Therefore, the control circuit 410 works normally and provides a high level to the pin ID2. The electronic device 230 operates in a device mode and the electronic device 210 provides power to the electronic device 230 and controls the electronic device 230. In another embodiment, when the control circuit 410 operates normally, the control circuit 410 disables the trigger circuits 420 and 430.

Figure 5:
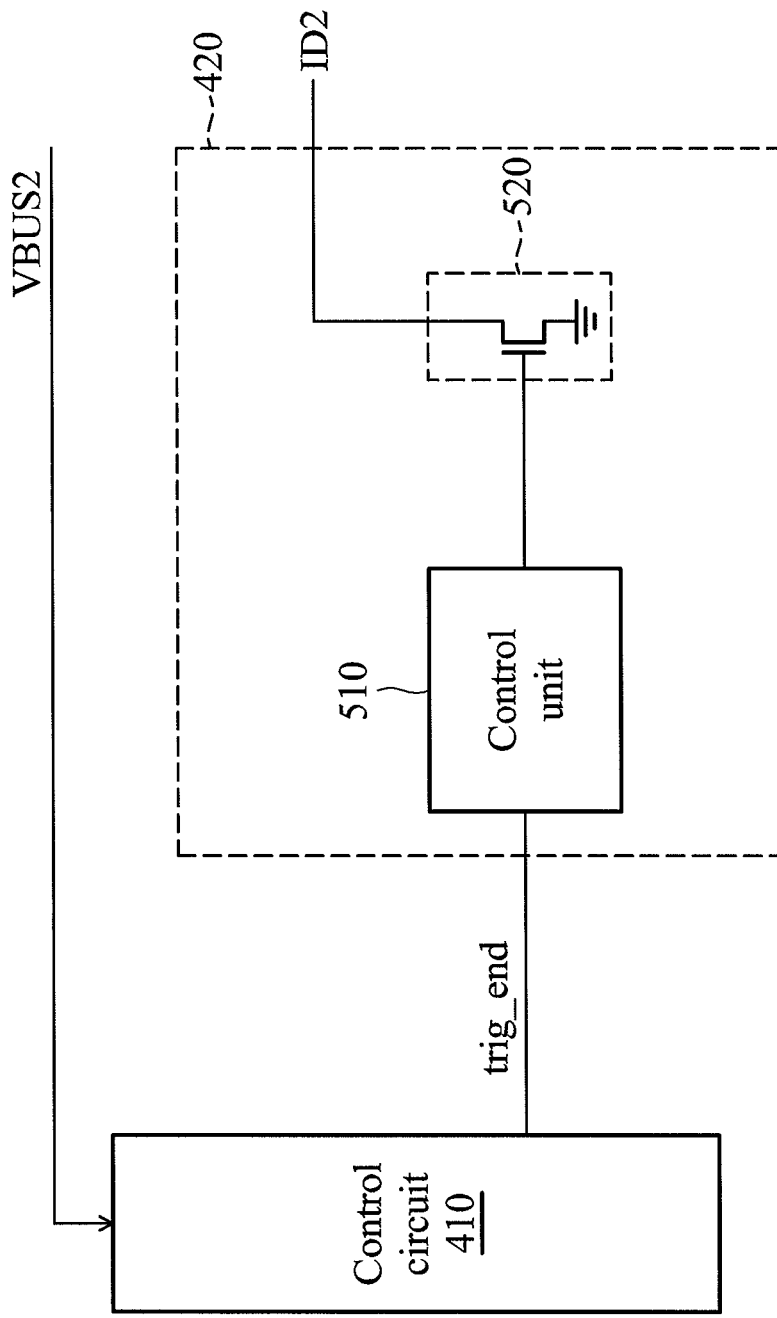
FIGS. 5 and 6 are schematic diagrams of exemplary embodiments of a trigger circuit, in accordance with some embodiments.

Since the principles of the trigger circuits 420 and 430 are the same, the trigger circuit 420 is given as an example to describe the principle of the trigger circuit 420. Refer to FIG. 5, the trigger circuit 420 includes a control unit 510 and a switch 520. The control unit 510 turns on or off the switch 520 according to the control signal trig_end. When the switch 520 is turned on, the switch 520 provides a low level to the pin ID2. When the switch 520 is turned off, the switch 520 stops providing the low level to the pin ID2.

In this embodiment, the switch 520 is first turned on such that the level of the pin ID2 is at the low level. At this time, if the electronic device 230 is an OTG device, the electronic device 230 provides a pre-determined voltage VCC to the pin VBUS2. The control circuit 410 starts working according to the pre-determined voltage on the pin VBUS2. In this embodiment, the control circuit 410 utilizes the control signal trig_end to activate the control unit 510 to continuously turn on the switch 520 such that the level of the pin ID2 is maintained at the low level. Therefore, the operation mode of the electronic device 230 is maintained in the host mode and the pre-determined voltage VCC is continuously provided.

The invention does not limit the circuit structure of the control unit 510. In one embodiment, the control unit 510 is a charge pump. When the control circuit 410 determines that the voltage of the pin VBUS2 is not equal to the pre-determined voltage VCC, the control circuit 410 generates the control signal trig_end to activate the control unit 510 to generate a negative voltage to turn off the switch 520. Therefore, the level of the pin ID2 is not equal to the second level, such as the low level.

In one embodiment, the switch 520 is a depletion-type N-type transistor. Since the D-type transistor has a real channel during the manufacturing process, after the source of the D-type transistor receives a low level, the transistor is capable of providing the low level to the pin ID2 even if the gate of the transistor does not receive voltage. In this case, when the control unit 510 provides a negative voltage to the gate of the transistor, the transistor stops providing the low level to the pin ID2.

Figure 6:
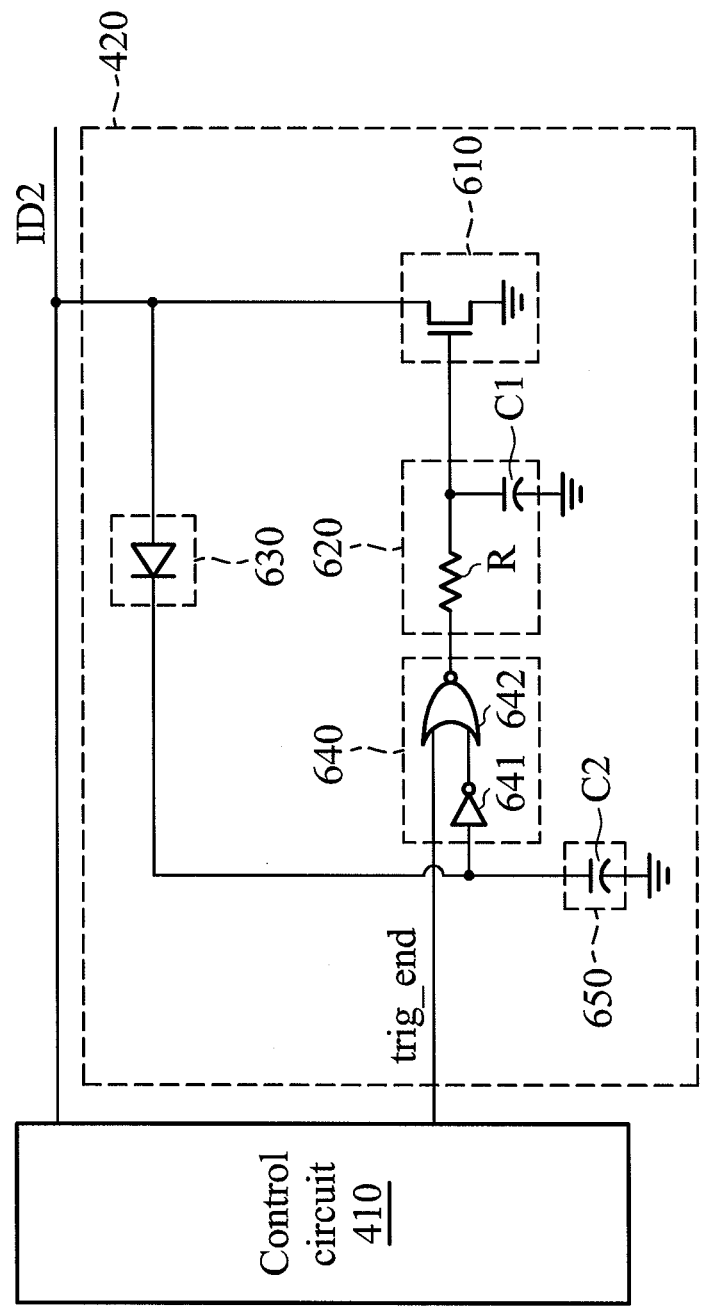

FIG. 6 is a schematic diagram of an exemplary embodiment of a trigger circuit, in accordance with some embodiments. The trigger circuit 420 includes switches 610, 640, a delay unit 620, an anti-reversing unit 630 and a storage unit 650. The switch 610 is coupled to the pin ID2 to set the level of the pin ID2 to a low level. In this embodiment, the switch 610 is an N-type transistor.

The delay unit 620 is configured to turn on the switch 610 to set the level of the pin ID2 to the low level. In this embodiment, the delay circuit 620 is coupled to the switch 610 and includes a resistor R and a capacitor C1. The anti-reversing unit 630 is coupled to the switch 610 and the delay unit 620. In this embodiment, the anti-reversing unit 630 is a diode. The storage unit 650 is coupled to the anti-reversing unit 630. In this embodiment, the storage unit 650 is a capacitor C2. The switch 640 receives the control signal trig_end and is coupled between the storage unit 650 and the delay unit 620. In this embodiment, the switch 640 includes a NOT gate 641 and a NOR gate 642.

If the pin ID2 is coupled to an electronic device, the level of the pin ID2 is pulled up. When the level of the pin ID2 is pulled to a high level, the anti-reversing unit 630 transmits the voltage on the pin ID2 to charge the storage unit 650. The gate voltage of the N-type transistor of the switch 610 is gradually increased according to the high level transmitted by the delay unit 620. When the voltage between the gate and source of the N-type transistor of the switch 610 is higher than the threshold voltage of the N-type transistor, the N-type transistor is turned on. Therefore, the level of the pin ID2 is pulled down. The level of the pin ID2 may be pulled to a low level. At this time, the anti-reversing unit 630 is in a reverse state such that the voltage stored in the storage unit 650 is not immediately released. Therefore, the level of the pin ID2 is temporarily maintained at the low level and the maintained time is defined by the capacitances of the capacitors C1 and C2.

In one embodiment, when the level of the pin ID2 is at the low level, the electronic device operates in a host mode and provides power, such as VCC, to the control circuit 410. Therefore, the control circuit 410 maintains the level of the pin ID2 at the low level. In one embodiment, the control circuit 410 turns on a switch to continuously provide a low level to the pin ID2.

In another embodiment, after maintaining the level of the pin ID2, the control circuit 410 outputs a control signal trig_end to disable the trigger circuit 420. In this embodiment, the control circuit 410 sets the control signal trig_end to a high level. Therefore, the switch 640 outputs a low level to turn off the switch 610. The invention does not limit the state of the control signal trig_end. In other embodiments, when the control signal trig_end is at a low level, the trigger circuit is disabled.

The invention does not limit the structure of the switch 640. In some embodiments, the switch 640 is a multiplexer. The multiplexer selectively outputs a high level or a low level according to the control signal trig_end to turn the switch 610 on or off.

Since the trigger circuit is capable of pulling down the level of the pin ID1 or ID2 temporarily, an OTG device temporarily operates in a host mode. After entering the host mode, the OTG device outputs an operation voltage to activate the control circuit. The control circuit maintains the level of the pin ID1 or ID2 at a low level such that the OTG device serves as a host device.

Additionally, the control chip determines that a computer is coupled to the connection module according to the level of the pin VBUS1 or VBUS2. Therefore, the control chip does not set the level of the pin ID1 or ID2 to the low level such that the OTG device enters a device mode to receive power and data provided by a computer.

Since the control chip can appropriately switches the operation mode of the OTG device according to the type of the external electronic device, if the control chip is combined in a cable, the user does not need two cables. The user is capable of using a single cable to control the operation mode of the OTG device.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A control chip, comprising:
a first pin configured to couple to a connection port;
a second pin configured to couple to the connection port;
a trigger circuit setting a level of the second pin to a second level when the connection port is coupled to an external electronic device and the level of the second pin is equal to a first level; and a control circuit maintaining the level of the second pin at the second level when a voltage of the first pin is equal to a pre-determined voltage.

2. The control chip as claimed in claim 1, wherein when the level of the second pin is equal to the second level, the external electronic device provides the pre-determined voltage to the first pin.

3. The control chip as claimed in claim 1, wherein the first level is higher than the second level.

4. The control chip as claimed in claim 1, wherein the external electronic device comprises a set unit setting the level of the second pin to the first level.

5. The control chip as claimed in claim 1, wherein when the level of the second pin is maintained at the second level, the control circuit disables the trigger circuit.

6. The control chip as claimed in claim 1, wherein the trigger circuit comprises:
a first switch coupled to the second pin;
a delay unit coupled to the first switch;
an anti-reversing unit coupled to the first switch and the delay unit;
a storage unit coupled to the anti-reversing unit; and
a second switch coupled between the storage unit and the delay unit.

7. The control chip as claimed in claim 6, wherein when the level of the second pin is equal to the first level, the anti-reversing unit charges the storage unit according to the first level, when the voltage stored in the storage unit reaches a pre-determined value, the first switch is turned on to set the level of the second pin to the second level, and when the voltage of the first pin is equal to the pre-determined voltage, the control circuit outputs a control signal and the second switch turns off the first switch according to the control signal.

8. A connection module comprising:
a first connection port configured to couple to a first external electronic device; and
a control chip comprising:
a first pin configured to couple to the first connection port;
a second pin configured to couple to the first connection port;
a trigger circuit setting a level of the second pin to a second level when the first connection port is coupled to the first external electronic device and the level of the second pin is equal to a first level; and
a control circuit maintaining the level of the second pin at the second level when a voltage of the first pin is equal to a pre-determined value.

9. The connection module as claimed in claim 8, further comprising:
a second connection port configured to couple to a second external electronic device, wherein when the level of the second pin is maintained at the second level, the first external electronic device provides power to and controls the second external electronic device.

10. The connection module as claimed in claim 8, wherein when the first external electronic device provides the pre-determined voltage to the first pin, the control circuit disables the trigger circuit to maintain the level of the second pin at the second level.

11. The connection module as claimed in claim 8, wherein when the level of the second pin is maintained at the second level, the first external electronic device provides the pre-determined voltage to the first pin.

12. The connection module as claimed in claim 8, wherein the first level is higher than the second level.

13. The connection module as claimed in claim 8, wherein the first external electronic device comprises a set unit to set the level of the second pin at the first level.

14. The connection module as claimed in claim 8, wherein the trigger circuit comprises:
a first switch coupled to the second pin;
a delay unit coupled to the first switch;
an anti-reversing unit coupled to the first switch and the delay unit;
a storage unit coupled to the anti-reversing unit; and
a second switch coupled between the storage unit and the delay unit.

15. The connection module as claimed in claim 14, wherein when the level of the second pin is equal to the first level, the anti-reversing unit charges the storage unit according to the first level, when the voltage stored in the storage unit reaches a pre-determined value, the first switch is turned on to provide the second level to the second pin, and when the voltage of the first pin is equal to the pre-determined voltage, the control circuit outputs a control signal and the second switch turns off the first switch according to the control signal.

16. A control chip comprising:
a first pin configured to couple to a connection port;
a second pin configured to couple to the connection port;
a trigger circuit providing a specific level to the second pin when the connection port is coupled to an external electronic device; and
a control circuit maintaining a level of the second pin at the specific level when a voltage of the first pin is equal to a pre-determined voltage.

17. The control chip as claimed in claim 16, wherein when the level of the second pin is maintained at the specific level, the external electronic device provides the pre-determined voltage to the first pin.

18. The control chip as claimed in claim 16, wherein when the level of the second pin is maintained at the specific level, the control circuit actives the trigger circuit to provide the specific level to the second pin.

19. The control chip as claimed in claim 16, wherein the trigger circuit comprises:
a first switch coupled to the second pin; and
a control unit coupled to the first switch.

20. The control chip as claimed in claim 19, wherein the control unit turns on the first switch to provide the specific level to the second pin, and when the voltage of the first pin is equal to the pre-determined voltage, the control circuit outputs a control signal and the control unit continuously turns on the first switch according to the control signal.

* * * * *